United States Patent [19]
Umeji

[11] Patent Number: 5,952,808
[45] Date of Patent: Sep. 14, 1999

[54] SYNCHRONIZATION RESTORING SYSTEM

[75] Inventor: Naoyuki Umeji, Komatsu, Japan

[73] Assignee: Komatsu Ltd., Tokyo, Japan

[21] Appl. No.: 09/077,295

[22] PCT Filed: Feb. 20, 1997

[86] PCT No.: PCT/JP97/00467

§ 371 Date: May 29, 1998

§ 102(e) Date: May 29, 1998

[87] PCT Pub. No.: WO97/33709

PCT Pub. Date: Sep. 18, 1997

[30] Foreign Application Priority Data

Mar. 15, 1996 [JP] Japan ................................. 8-059737

[51] Int. Cl.$^6$ .............................................. G05B 11/32
[52] U.S. Cl. ..................... 318/625; 318/85; 72/405.01; 198/621.1
[58] Field of Search ...................... 318/625, 632, 318/34, 45, 66–69, 85; 198/621.1–621.4

[56] References Cited

U.S. PATENT DOCUMENTS

| | | | |
|---|---|---|---|
| 3,803,464 | 4/1974 | Kuroyanagi | 318/85 |
| 4,087,172 | 5/1978 | Dongen | 399/375 |
| 4,540,087 | 9/1985 | Mizumoto | 198/621.1 |
| 4,653,311 | 3/1987 | Tack, Jr. | 72/443 |
| 4,654,569 | 3/1987 | Mizumoto et al. | 318/568.1 |
| 4,788,811 | 12/1988 | Kawajiri et al. | 53/426 |
| 5,105,647 | 4/1992 | Maher | 72/405.13 |
| 5,150,022 | 9/1992 | Waddington | 318/563 |
| 5,582,061 | 12/1996 | Harsch et al. | 72/405.1 |
| 5,621,289 | 4/1997 | Doyama | 318/432 |
| 5,649,443 | 7/1997 | Shiroza et al. | 72/405.1 |
| 5,730,278 | 3/1998 | Baba et al. | 198/621.1 |
| 5,808,465 | 9/1998 | Gentile et al. | 324/207.17 |

FOREIGN PATENT DOCUMENTS

| | | |
|---|---|---|
| 5-76632 | 10/1993 | Japan . |
| 5-305368 | 11/1993 | Japan . |
| 6-218458 | 8/1994 | Japan . |
| 6-262280 | 9/1994 | Japan . |

*Primary Examiner*—Brian Sircus
*Attorney, Agent, or Firm*—Armstromg, Westerman, Hattori, McLeland & Naughton

[57] ABSTRACT

Synchronization of the drive bars of a servo transfer system is safely restored, while avoiding mechanical damage as much as possible.

A synchronization position C for all the drive bars is determined from the respective present positions B of the drive bars and the respective deviations of the present positions B from the synchronization position C are determined. Then, servo motors for all the drive bars are so controlled that the drive bars move the distances corresponding to their respective deviations within the same period of time.

4 Claims, 6 Drawing Sheets

SYNCHRONIZATION RESTORING SYSTEM

TECHNICAL FIELD

The present invention relates to a synchronization restoring system which is suited for use in a servo transfer system in which a multiplicity of drive bars are driven by servo driving mechanisms to move the feed bars in the direction of a lift axis, and which restores the drive bars to synchronization in the event that they lose synchronization.

BACKGROUND OF THE INVENTION

There are known transfer presses which include a transfer system for conveying workpieces to be pressed through a series of work stations in timed relation with performance of a series of pressing operations. Typically, the transfer system comprises a pair of feed bars juxtaposed so as to extend in a workpiece transferring direction and cross bars each spanned between these feed bars. The transfer system conveys workpieces held by vacuum caps by vacuum adsorption, these vacuum caps being attached to the respective cross bars. Alternatively, the transfer system conveys workpieces gripped at both sides by fingers attached to the feed bars. In this case, the pair of feed bars perform two-dimensional or three-dimensional movement to transfer an individual workpiece from one station where a set of dies are disposed to the next adjacent station where another set of dies are disposed.

The most typical method for driving the feed bars is a mechanical driving method in which the feed bars are driven, being linked to the press system with a cam and linkage mechanism. This method however reveals the disadvantage that adjustment at the time of die replacement is extremely difficult and therefore the individual driving method (such as disclosed in Japanese Patent Laid-Open Publication No. 6-218458 (1994)) becomes prevailing recently according to which the feed bars are driven with motors (servo motors) different from the motor for the press system. Transfer presses having a transfer system (servo transfer system) driven by the individual driving method has the advantage that the transfer system can be changed arbitrarily in its movement and has a simple configuration.

If the above transfer system encounters abnormal conditions such as when excessive load is imposed on a servo motor for one of the drive bars during operation, the drive bars would lose synchronization and be brought to an emergency stop. If such a malfunction occurs, all the drive bars need to be moved from their respective stop positions to a specified position in order to restore the drive bars to synchronization. In this case, if all the drive bars are moved to the specified position X at the same speed, the arrival times of the respective drive bars vary according to the distances of their stop positions from the specified position X, as understood from FIG. 6. In some cases, the movement of the drive bars to the specified position causes the rigid, feed bars Y to be distorted with an excessive force.

The present invention is directed to overcoming the above problem and one of the objects of the invention is therefore to provide a synchronization restoring system which is capable of safely restoring the drive bars of a servo transfer system to synchronization, while avoiding mechanical damage as much as possible.

It should be noted that the definition of the feed bars disclosed herein include lift beams such as described in Japanese Patent Laid-Open Publication No. 6-218458, the lift beams having cross bars that are mounted thereto so as to be freely movable in a workpiece transferring direction and being designed to ascend and descend but not to move in the transferring direction.

DISCLOSURE OF THE INVENTION

The above object can be achieved by a synchronization restoring system for restoring drive bar synchronization in a servo transfer system which carries out movement of feed bars in the direction of a lift axis by driving a multiplicity of drive bars with servo driving mechanisms, the restoring system comprising:

(a) synchronization position detecting means for determining a synchronization position for all the drive bars from the respective present positions of the drive bars;

(b) deviation detecting means for determining the deviation of the present position of each drive bar from the synchronization position determined by the synchronization position detecting means; and (c) controller means for controlling servo motors for the drive bars such that the drive bars respectively move the distances corresponding to their respective deviations determined by the deviation detecting means within the same period of time.

According to the invention, in the event that the transfer system stops due to a loss of synchronization in the drive bars, restoration of synchronization is carried out in the following procedure: a synchronization position for all the drive bars is first determined from the respective present positions of the drive bars; the respective deviations of the present positions of the drive bars from the synchronization position are determined; and then, the servo motors for the drive bars are controlled to respectively move the associated drive bars the distances corresponding to their respective deviations within the same period of time. Thus, the drive bars start to move to the synchronization position at the same time and arrive there at the same time, so that the load to be imposed on the feed bars or on the motors during the restoration can be minimized. With this arrangement, restoration of the drive bars to synchronization can be performed without drawing the operator's attention, while avoiding mechanical damage as much as possible.

Preferably, the controller means of the invention controls the acceleration and deceleration of the servo motors according to cycloid curves when the feed bars start and stop movement from the synchronization position to a destination. If the acceleration/deceleration of the servo motors at the start and stop is performed in accordance with straight lines, it causes abrupt changes in the acceleration and deceleration speeds and as a result, the movement of the feed bars cannot be smoothly started and stopped unless followability is sacrificed by reducing gain. In contrast with this, the acceleration/deceleration in accordance with cycloid curves allows a smooth start and stop in the feed bar movement with less changes in the acceleration and deceleration speeds.

When the feed bars are in ascendant movement, the above synchronization position is determined to correspond to the highest position of the present positions of the drive bars, and when the feed bars are in descendent movement, the synchronization position is determined to correspond to the lowest position of the present positions of the drive bars. With this arrangement, the feed bars neither descend during lifting operation nor ascend during lowering operation, which enables it to smoothly restore the drive bars to the synchronization position without giving a feeling of disorder to the operator.

The synchronization position may be determined to correspond to the average of the levels of the present positions of the drive bars. This minimizes the moving distance of each drive bar at the time of restoration.

BEST MODE FOR CARRYING OUT THE INVENTION

Figure 1:
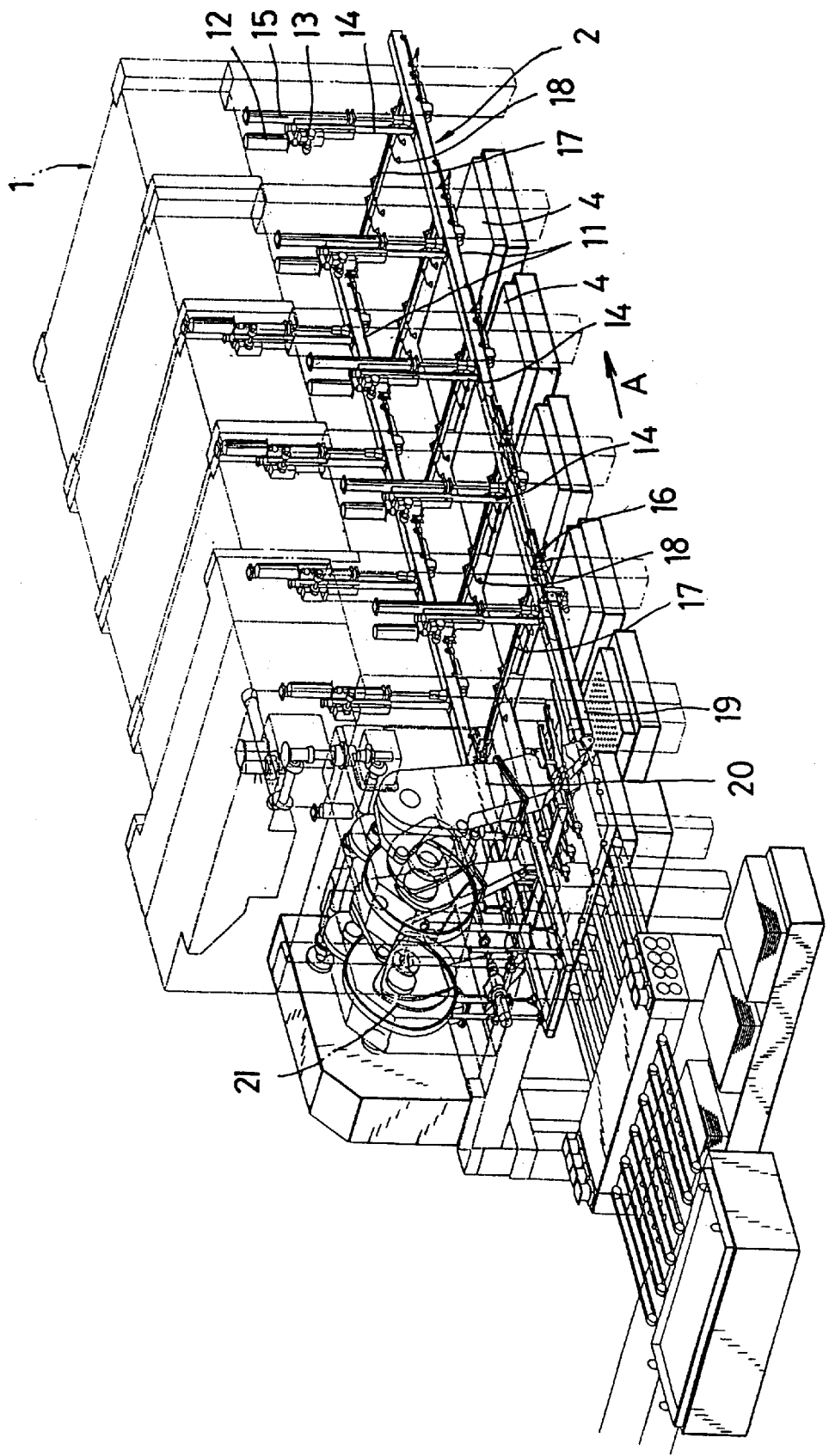
FIG. 1 is a schematic general perspective view of a transfer press constructed according to one embodiment of the invention.

Referring now to the drawings, a synchronization restoring system constructed according to a preferred embodiment of the invention will be hereinafter described.

Figure 2:
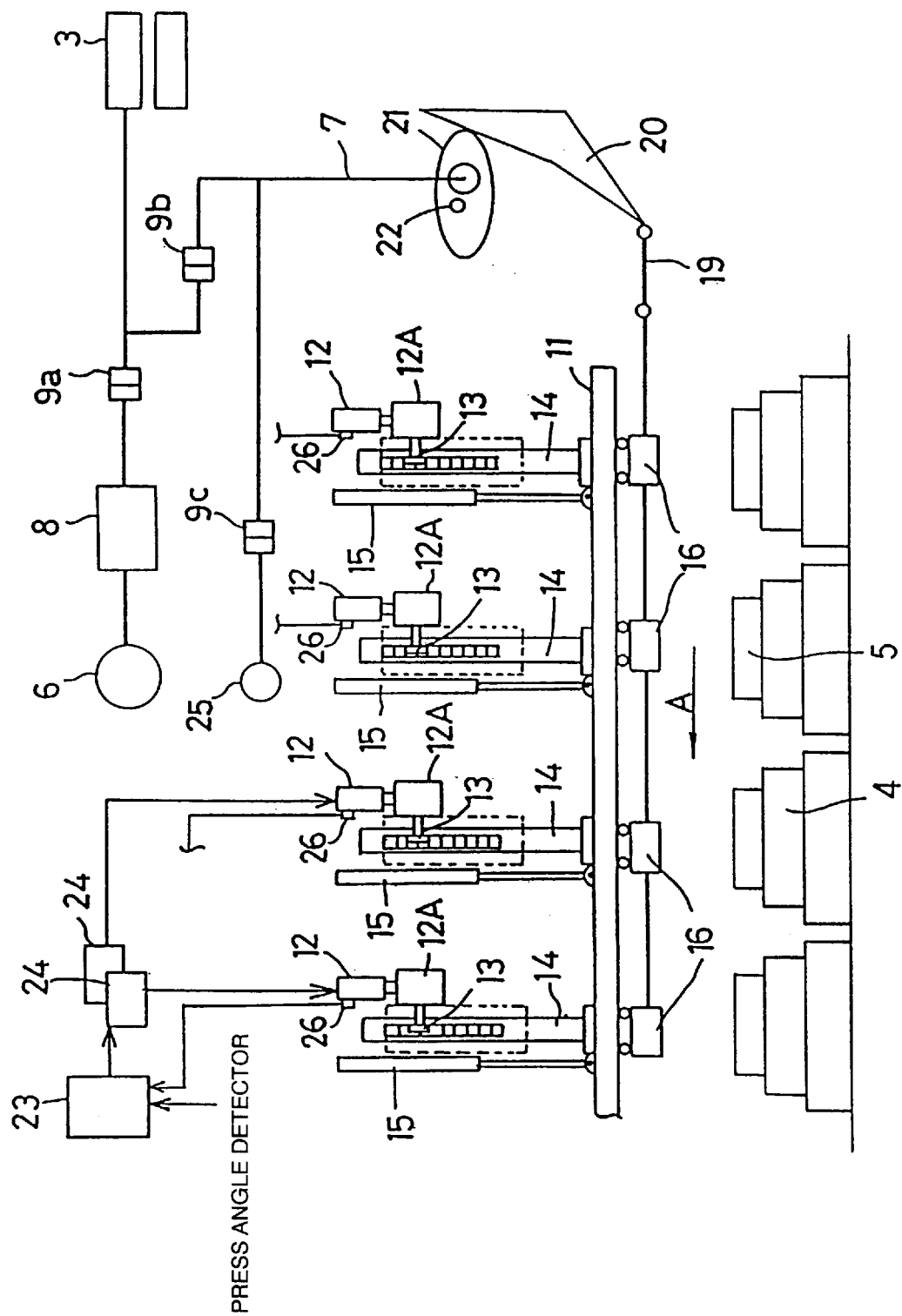
FIG. 2 diagrammatically depicts the system structure of the transfer press according to the embodiment.

FIG. 1 schematically depicts a general, perspective view of a transfer press constructed according to one embodiment of the invention, and FIG. 2 diagrammatically depicts the system structure of this transfer press. As shown in FIG. 1, the transfer press according to this embodiment comprises a press system 1 and a transfer system 2. The press system 1 has a series of work stations which perform successive pressing operations on each workpiece (not shown) whereas the transfer system 2 is disposed within the press system 1, for transferring the workpieces in a feeding direction A.

The press system 1 includes a press slide 3 which is reciprocable vertically by slide driving mechanisms spanned at the respective work stations. Upper dies are attached to the underside of the press slide 3 while lower dies are so attached to moving bolsters 4 as to respectively face their corresponding upper dies so that pressing operations can be performed on the respective workpieces placed between these dies. Each of the slide driving mechanisms comprises a main motor 6 controlled according to signals from a press controller; a drive shaft 7 driven by the main motor 6; a flywheel unit 8, clutches 9a, 9b and a brake (not shown) attached to the drive shaft 7.

The transfer system 2 has a pair of feed bars 11 juxtaposed so as to extend along the workpiece feeding direction A, being suspended from above by means of lift mechanisms attached to the press system 1. Each lift mechanism includes a pinion 13 rotated by a servo motor 12 through reduction gears 12A and a rack bar 14 which meshes with the pinion 13. The feed bars 11 are supported at the respective lower ends of the rack bars 14 and driven by the servo motors 12 so as to move vertically in synchronous relation with the movement of the press system 1. Balance cylinders 15 are disposed at positions adjacent the respective rack bars 14, for maintaining a balance between the fluid pressure imposed on each balance cylinder 15 and the weight of the feed bars 11 etc. In this embodiment, five servo motors 12 are aligned at equal intervals on both sides so that the ten servo motors 12, in total, cooperate to lift or lower the pair of feed bars 11.

Supported on the undersides of the feed bars 11 are a plurality of cross bar carriers 16 which are spaced in the feeding direction A so as to be movable both in the feeding direction A and in the direction opposite to the feeding direction A. A cross bar 17 is spanned between each opposing pair of cross bar carriers 16 so as to extend in a direction perpendicular to the feeding direction A. The cross bars 17 respectively have vacuum cups 18 attached thereto for adsorbing the workpieces.

The cross bar carriers 16 adjacent to each other in the feeding direction A are coupled to each other by a coupling rod so that all the cross bar carriers 16 can simultaneously move both in the feeding direction A and in the direction opposite thereto. The most upstream cross bar carrier 16 attached to each feed bar 11 is connected to the distal end of each cam lever 20 by means of a coupling rod 19. The base end of each cam lever 20 adjoins to a feed cam 21 which is rotatable by power delivered from the press system 1. The rotation of the feed cams 21 brings the cam levers 20 in rocking movement thereby moving the cross bar carriers 16 both in the feeding direction A and in the direction opposite thereto.

The angle of rotation of each drive shaft 7 is detected by a press angle detector (cam angle detector) 22 and according to this detected press angle, each servo motor 12 is controlled by a transfer system controller 23 through its servo amplifier (servo driver) 24. With this arrangement, the cross bar carriers 16 of the transfer system 2 reciprocate in the feeding direction A and in the direction opposite thereto synchronously with the movement of the press system 1 so that the vacuum cups 18 attached to the cross bars 17 successively transfer the adsorbed workpieces to the respective work stations.

The servo motors 12 are each equipped with a position detector (encoder) 26 for detecting the present position of the servo motor 12 and each position detector 26 generates a positional signal to input to a transfer system controller 23. The transfer system controller 23 calculates the difference between present position data input from each position detector 26 and press angle data input from a press angle detector 22 and generates a movement command to the associated servo motor 12 through its servo amplifier 24 such that the difference becomes equal to zero.

It should be noted that there is provided an independent motor 25 for independently driving the transfer system 2 and each drive shaft 7 is also driven by this independent motor 25 through a clutch 9c.

Figure 3:
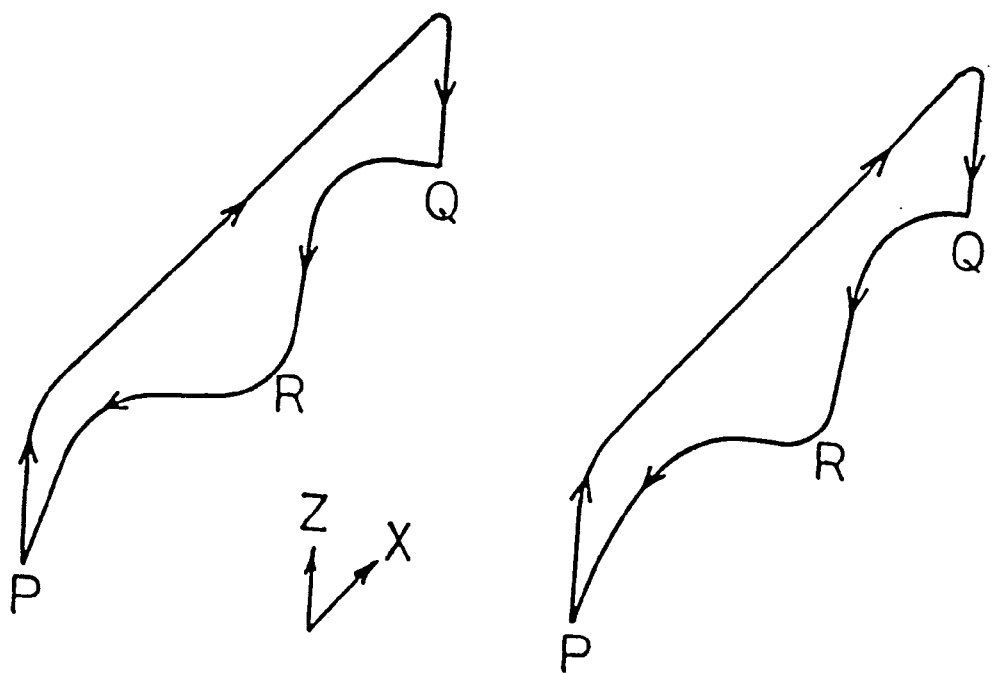
FIG. 3 depicts an example of the motion pattern of a transfer system.

The transfer system 2 is driven according to a specified motion pattern in order to avoid the interference between the dies and the workpieces being transferred by the transfer system 2. FIG. 3 shows a two-dimensional motion pattern as one example of this motion pattern. According to this example, for moving onto the lower die of the previous work station, the transfer system 2 is first lifted at the stand-by point R, and then moved to and lowered at the adsorbing point P. At the adsorbing point P, the transfer system 2 adsorbs the workpiece to lift out of the lower die of the previous work station in the direction of Z axis and then conveys it in the direction of X axis to the position above the lower die of the next work station. To place the workpiece in this lower die, the transfer system 2 is lowered to release the workpiece at the releasing point Q. After releasing, the transfer system 2 is lifted and then moved back downwardly to the stand-by point R thereby terminating one cycle.

Figure 4:
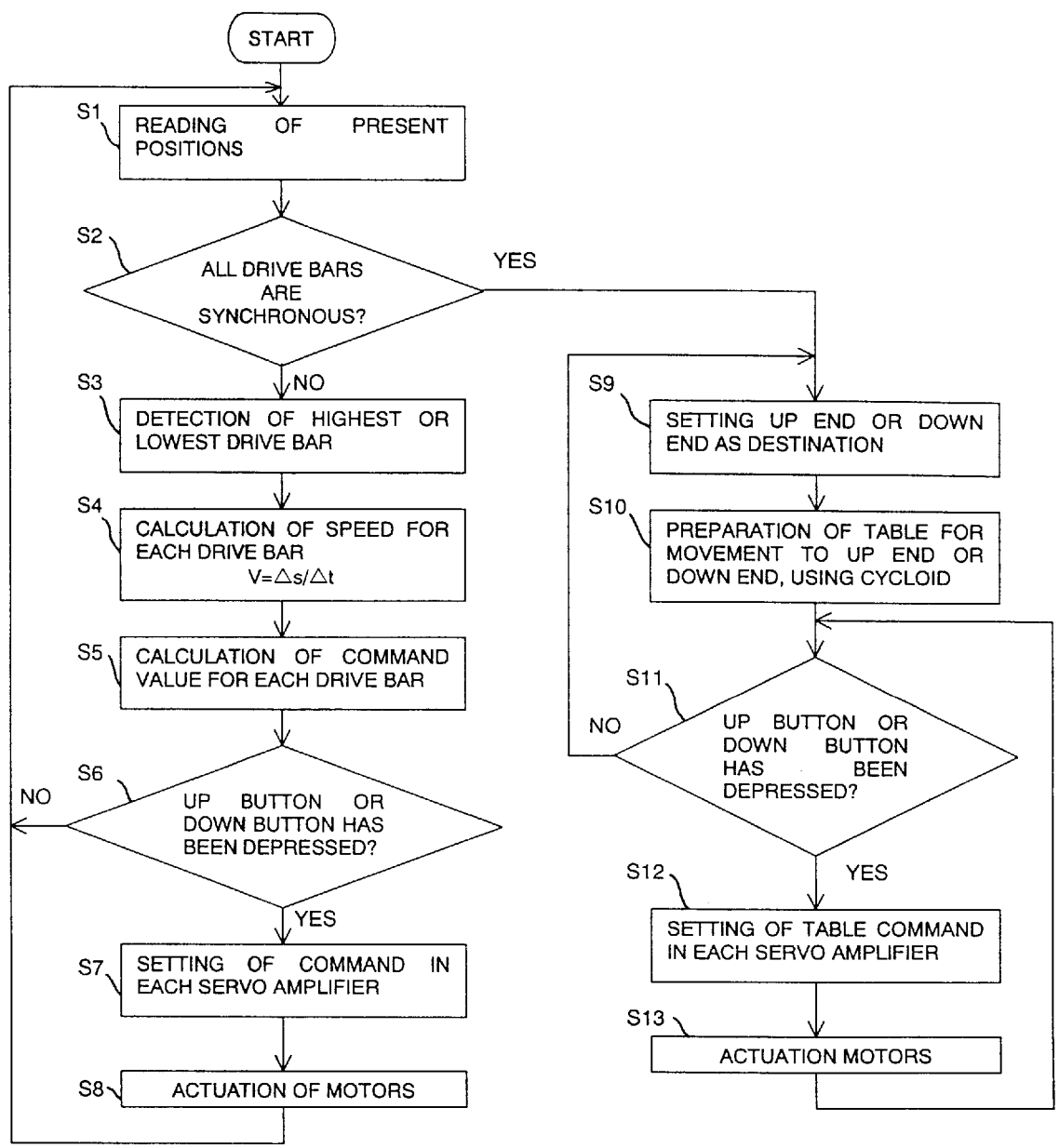
FIG. 4 is a flow chart of a program for restoring synchronization.

If an error occurs in such a transfer system 2 during operation, the transfer system 2 may be brought to an emergency stop with a synchronization failure in the drive bars of the servo motors 12, as shown in FIG. 5(a). In this embodiment, in the event that such a synchronization failure occurs, synchronization is restored according to the flow chart shown in FIG. 4. The flow of this synchronization restoring process will be described with reference to the flow chart.

S1 to S2: The present value (present level) of each drive bar is read and a check is made to determine whether all the drive bars are in a synchronous relation, that is, whether there is a difference between the levels of the drive bars.

S3 to S5: If the drive bars are not synchronous, the drive bar positioned at the highest level (the highest drive bar) and the drive bar positioned at the lowest level (the lowest drive bar) are detected. Then, speed V for each drive bar is calculated using the equation $V=\Delta s/\Delta t$ and a command value to be released to the servo amplifier 24 for each drive bar is obtained from the speed V. It should be noted that $\Delta s$ is the distance from the present position of each drive bar to the position of the highest drive bar when the feed bars 11 are lifted, and $\Delta s$ is the distance from the present position of each drive bar to the position of the lowest drive bar when the feed bars 11 are lowered. $\Delta t$ is the time required for moving the drive bars from their present positions B to a synchronization position C (see FIG. 5), which is a predetermined value common to all the drive bars. Thus, the greater the value $\Delta s$, the greater the calculated speed V.

Figure 5:
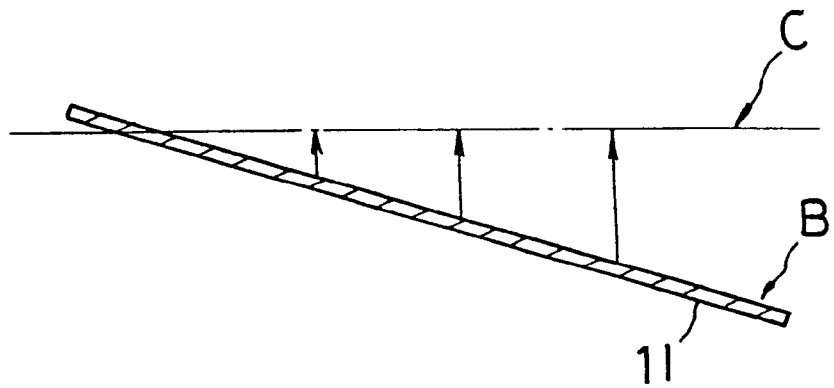
FIGS. 5(a) and 5(b) depict the manner in which synchronization is restored according to the embodiment.
Figure 5:
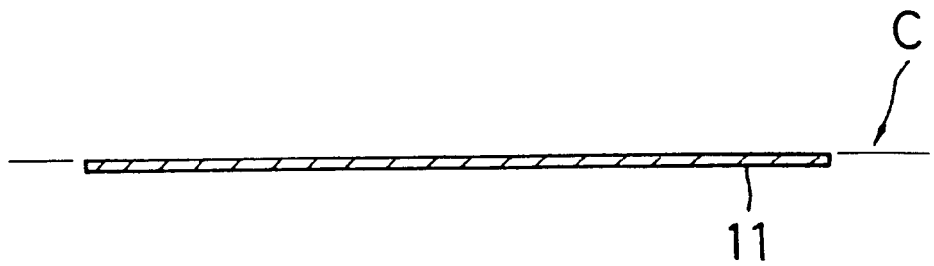
Figure 6:
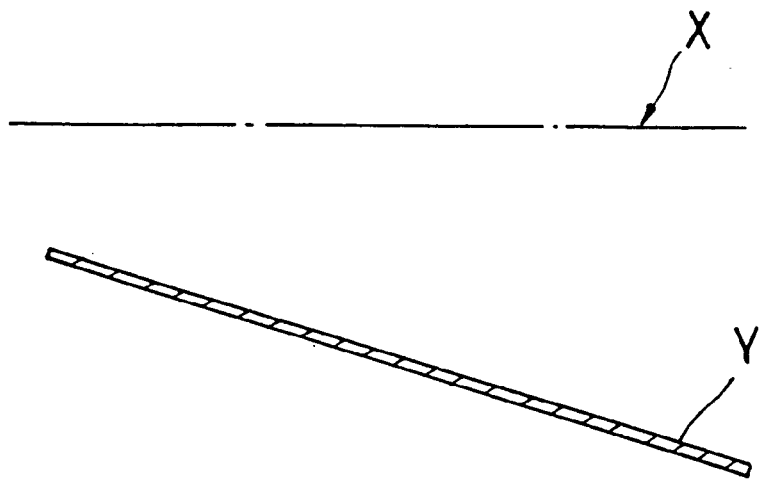
FIGS. 6(a) and 6(b) depict the manner in which synchronization is restored according to prior art.
Figure 6:
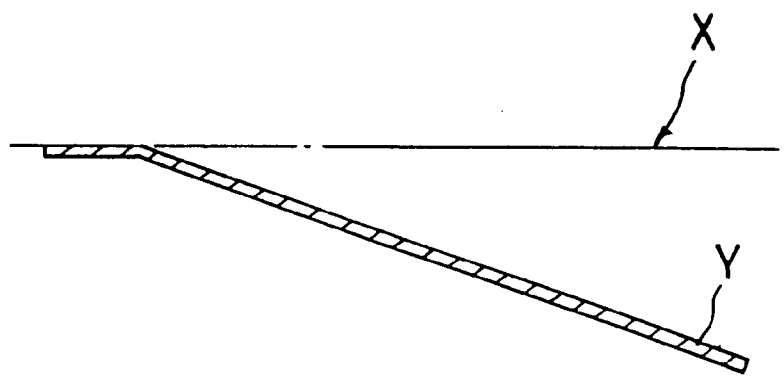

S6 to S8: If either an Up button or Down button (both buttons serve as a press button for independent manual operation generally called as "JOG operation") is depressed, the calculated, command values are respectively set in the corresponding servo amplifiers 24 and the servo motors 12 are actuated. If neither the Up button nor Down button is depressed, the program returns to step S1. Thus, when the Up button is depressed, each drive bar moves to the level of the highest drive bar as shown in FIG. 5 and when the Down button is depressed, each drive bar moves to the level of the lowest drive bar, so that all the drive bars become synchronous. Since the value of $\Delta t$ is constant, all the drive bars start and finish their movement at the same time.

S9 to S10: When all the drive bars have reached the synchronization position with the above-described process, or if it is detected that all the drive bars are in a synchronous condition, the program proceeds to the normal JOG operation and a predetermined Up or Down end is set as a destination for each drive bar. Then, a movement table for movement from the present position of the drive bars to the Up or Down end is generated such that the acceleration at the time of starting and the deceleration at the time of stopping are controlled according to cam curves such as cycloid curves.

S11 to S13: If either the Up button or Down button is depressed, a table command value is set in the servo amplifiers 24 and the servo motors 12 are actuated. If neither the Up button nor the Down button is depressed, the program returns to step S9. After the servo motors 12 have been actuated, the program stands by until the Up button or Down button is next depressed. Lifting or lowering of the drive bars is synchronously performed in this way. Possible shock which may occur when the drive bars start and stop in the lifting/lowering movement can be reduced, since the acceleration and deceleration at the time of the start and stop are designed to follow cycloid curves or similar curves.

In the foregoing embodiment, the level of the highest drive bar is set as the synchronization position when the feed bars are in lifting operation and the level of the lowest drive bar is set as the synchronization position when the feed bars are in lowering operation. In an alternative embodiment, the synchronization position may be set to correspond to the average of the present levels of the drive bars, and the drive bars at higher positions than the average level are lowered while the drive bars at lower positions than the average level being lifted, thereby to restore synchronization.

I claim:

1. A synchronization restoring system which restores drive bar synchronization in a servo transfer system which carries out movement of feed bars in the direction of a lift axis by driving a multiplicity of drive bars with servo driving mechanisms, the restoring system comprising:

(a) synchronization position detecting means for determining a synchronization position for all the drive bars from the respective present positions of the drive bars;

(b) deviation detecting means for determining the deviation of the present position of each drive bar from the synchronization position determined by the synchronization position detecting means; and (c) controller means for controlling servo motors for the drive bars such that the drive bars respectively move the distances corresponding to their respective deviations determined by the deviation detecting means within the same period of time.

2. A synchronization restoring system according to claim 1, wherein the controller means controls the acceleration and deceleration of the servo motors according to cycloid curves, when the feed bars start and stop movement from the synchronization position to a destination.

3. A synchronization restoring system according to claim 1 or 2, wherein when the feed bars are in ascendant movement, said synchronization position is determined to correspond to the highest level of the present positions of the drive bars, and when the feed bars are in descendent movement, said synchronization position is determined to correspond to the lowest level of the present positions of the drive bars.

4. A synchronization restoring system according to claim 1 or 2, wherein said synchronization position is determined to correspond to the average of the levels of the present positions of the drive bars.

* * * * *